(12) United States Patent
Park et al.

(10) Patent No.: US 7,391,779 B2
(45) Date of Patent: Jun. 24, 2008

(54) SCHEDULING METHOD AND APPARATUS FOR COMBINED CODE DIVISION MULTIPLEXING AND TIME DIVISION MULTIPLEXING

(75) Inventors: Sung K. Park, Kanata (CA); Hong Ren, Kanata (CA); Ning Guo, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1080 days.

(21) Appl. No.: 10/179,953

(22) Filed: Jun. 26, 2002

(65) Prior Publication Data

US 2004/0008655 A1 Jan. 15, 2004

(51) Int. Cl.
*H04L 12/56* (2006.01)
*H04L 12/43* (2006.01)
*H04B 7/216* (2006.01)

(52) U.S. Cl. .................. 370/395.4; 370/441; 370/458
(58) Field of Classification Search ............... 370/208, 370/209, 458, 478, 395.4, 436, 441, 442, 370/479, 480, 498
See application file for complete search history.

(56) References Cited

U.S. PATENT DOCUMENTS 6,711,144 B1 * 3/2004 Kim et al. .................. 370/335
2004/0043784 A1 * 3/2004 Czaja et al. ................. 455/522

OTHER PUBLICATIONS

Huang et al, QoS-Oriented Access Control for 4G Multimedia CDMA Communicaitons, Mar. 2002, IEEE Communications Magazine, vol. 2460, pp. 118-125.*

Parkvall et al, Evolving WCDMA for Improved High Speed Mobile Internet, 2001, Ericsson Research, pp. 1-5.*

Gilhousen, Klein S.; Jacobs, Irwin M.; Viterbi, Andrew J.; Weaver, Lindsay A.; Wheatley III, Charles E.; on the Capacity of a Cellular CDMA System; IEEE Transactions on Vehicular Technology, vol. 40, No. 2, May 1991, pp. 303-312.

Fourth-Generation Mobile Initiatives and Technology *QoS-Oriented Access Control for 4G Mobile Multimedia CDMA Communications,* Vincent Huang and Weihua Zhuang, University of Waterloo, Canada, IEEE Communications Magazine, pp. 118-125, Mar. 2002.

*Evolving WCDMA for Improved High Speed Mobile Internet,* Stefan Parkvall, Janne Peisa, Anders Furuskür, Maria Samuelsson and Magnus Persson, Ericsson Research, pp. 1-5, 2001.

* cited by examiner

*Primary Examiner*—Doris H. To
*Assistant Examiner*—Feben Micael Haile

(57) ABSTRACT

A combined CDM/TDM (code division multiplexing/time division multiplexing) transmitter and method are provided which employ fractional slot assignment by assigning fractional CDM channel gains to multiple slots for at least one packet with a goal that a sum of fractional CDM gains assigned each packet over a scheduling period meet a required threshold. In some embodiments, the transmitter is adapted to determine which users to transmit during a given slot, and to determine fractional CDM channel gains using an optimization of fractional CDM channel gain and user assignment which maximizes a number of users each of which is assigned a respective group of one or more slots with fractional CDM channel gains which sum to the required threshold for the user.

33 Claims, 4 Drawing Sheets

SCHEDULING METHOD AND APPARATUS FOR COMBINED CODE DIVISION MULTIPLEXING AND TIME DIVISION MULTIPLEXING

FIELD OF THE INVENTION

The invention relates to a scheduling method and apparatus for systems employing combined code division multiplexing and time division multiplexing.

BACKGROUND OF THE INVENTION

The forward link of 1×EV-DV (see for example "Physical Layer Standard for cdma2000 Spread Spectrum Systems", IS2000 Release C. 3GPP2 C.S0002-C) uses code division multiplexing (CDM) within time division multiplexing (TDM) (1.25, 2.5 or 5 ms slots) on a shared channel (SHCH) that allows flexible slot scheduling and slots for real time services such as voice and video for multiple users. Each time slot has a set of Walsh codes (WC), and has its power allocation split between one or more voice users. 1×EV-DV allows one data user and multiple voice users per slot. Voice users may take several of the WC codes. For instance, full rate voice users can use either one or two SHCH $W^{16}$ codes. Half, quarter and eighth rate voice uses convolutional coding and uses only one $W^{16}$ code.

1×EV-DV allows users to be scheduled over a certain number of slots in every frame (e.g., 20 ms) by allocating Walsh code gains that are to be controlled based on channel estimations from each user. There is no solution for doing this allocation in a manner that maximizes voice capacity.

Voice capacity of 1×EV-DV strongly depends on a scheduling scheme. This implies that an efficient scheduling algorithm is needed in order to maximize the voice capacity. However, scheduling users efficiently over slots in each frame is a very difficult problem because it is a combinatorial optimization problem that is NP-hard (non-polynomial-hard).

Many scheduling algorithms have been proposed in the literature for various purposes. However, there are no scheduling algorithms that can be applied effectively directly to 1×EV-DV. Schemes which have been proposed were to obtain a feasible solution but these do not provide any quality guarantee. For instance, Zig-Zeg or round-robin schemes have been proposed for the forward link due to the difficulty of the NP-hard characteristics of the scheduling problem.

SUMMARY OF THE INVENTION

According to one broad aspect, the invention provides a combined CDM/TDM (code division multiplexing/time division multiplexing) transmitter employing fractional slot assignment by assigning fractional CDM channel gains to multiple slots for at least one packet with a goal that a sum of fractional CDM gains assigned each packet over a scheduling period meet a required threshold.

In some embodiments, the transmitter is adapted to determine which users to transmit during a given slot, and to determine fractional CDM channel gains using an optimization of fractional CDM channel gain and user assignment which maximizes a number of users each of which is assigned a respective group of one or more slots with fractional CDM channel gains which sum to the required threshold for the user.

In some embodiments, the transmitter is adapted to determine which users to transmit during a given slot, and to determine fractional CDM channel gains using an optimization of fractional CDM channel gain and user assignment which jointly maximizes a number of users each of which is assigned a respective group of one or more slots with fractional CDM channel gains which sum to the required threshold for the user, and maximizes the total amount of CDM channel gain assigned subject to a maximum.

In some embodiments, the transmitter is adapted to, at the start of each frame start the scheduling operation afresh, with the scheduling period having a number of slots to be scheduled $N_s$ initially equalling a total number of slots $N_f$ being scheduled for the frame, and a number of users being scheduled $N_u$ initially equalling a total number of users to be scheduled; for current slot k, perform a scheduling operation for slot k through slot $N_f$ by: obtain inputs to the scheduling operation comprising a CDM channel gain for each user and each slot; determine the fractional CDM channel gains by optimizing the CDM channel gains for each user and each slot to produce optimized CDM channel gains so as to maximize a number of users scheduled during the plurality of slots with a total CDM channel gain as great as the required threshold function of channel estimates for each user and each slot, with an optimized CDM channel gain of zero for a given slot and user meaning the user is not scheduled during the slot; allocate users having an optimized CDM channel gain greater than zero for slot k to the current slot k using the optimized CDM channel gain for that user and slot as the fractional CDM channel gain; for users having a voice packet transmitted after the current slot, decrement $N_u$; increment k and decrement $N_s = N_f - k$.

In some embodiments, the transmitter is further adapted to, after each slot, decrement the required threshold for each user scheduled by an amount equal to the optimized CDM channel gain assigned during the slot.

In some embodiments, the transmitter is further adapted to, after a given user's required threshold has been decremented to zero, and an acknowledgement of successful transmission has not been received within a specified time, reset the given user's required threshold.

In some embodiments, the CDM channels are Walsh code channels.

In some embodiments, obtaining inputs to the scheduling operation comprises determining $CHE_{ik}$, a channel estimate for user i in slot k; determining $\omega_{ik}$, a number of CDM channels allocated to user i in slot k; determining $\xi$, the required threshold; determining $\phi_{ik}$, a CDM channel gain for user i in slot k.

In some embodiments, the transmitter is further adapted to, determine $G_i$, a processing gain for user i; determine $\beta$, a portion of power to be allocated to traffic channel; wherein determining $\phi_{ik}$ is done according to $\phi_{ik} = \xi/\alpha_{ik}$ where $\alpha_{ik} = G_i \cdot \beta \cdot CHE_{ik}$.

In some embodiments, optimizing the CDM channel gains for each user and each slot, with an optimized channel gain of zero for a given slot meaning the user is not scheduled during the slot comprises performing an optimization of an objective function which maximizes a number of users that will be allocated enough CDM channel gain over one or more slots to meet the required threshold to determine $u_{ik}$, an optimization factor for user i in slot k, where $u_{ik} > 0$ if user i is allocated in slot k, and $u_{ik} = 0$ otherwise subject to constraints that a summation of CDM channel gain of users allocated in a slot should be less than or equal to a total available CDM channel gain, and a summation of the number of CDM channels of users allocated in a slot should be less than or equal to total available number of CDM channels per slot; determining optimized CDM channel gain according to $\phi_{ik}^* = \phi_{ik} u_{ik}$ for user i in slot k.

In some embodiments, the optimization is performed using a Lagrangean relaxation technique employing decomposition and subgradiant optimization.

According to one broad aspect, the invention provides a combined orthogonal channel/TDM system comprising a transmitter adapted to transmit using a plurality of orthogonal channels during each of sequence of time division mulitplexed slots; the transmitter employing fractional slot assignment to multiple slots for at least one packet with a goal that a sum of fractional orthogonal channel gains assigned each packet over a scheduling period meet a required threshold; a receiver adapted to perform diversity combining of fractionally assigned slots.

In some embodiments, the orthogonal channels are CDM channels.

In some embodiments, the orthogonal channels are OFDM sub-carriers.

According to one broad aspect, the invention provides a method of scheduling users in a combined orthogonal channel/TDM (time division multiplexing) frame structure, with each frame containing a plurality of time slots, and a plurality of orthogonal channels during each time slot, each user having a required threshold, the method comprising scheduling at least one user's packet to be transmitted during a first slot of said plurality of time slots and to be retransmitted during at least one second slot of said plurality of time slots with a fractional orthogonal channel gain during each of the first slot and the at least one second slot being less than the target transmit power for the user.

In some embodiments, the orthogonal channels are CDM channels.

In some embodiments, the orthogonal channels are OFDM sub-carriers.

In some embodiments, a method further comprises determining which users to transmit during a given time slot and determining fractional orthogonal channel gains using an optimization of fractional orthogonal channel gain user assignment which maximizes a number of users each of which is assigned a respective group of one or more slots with fractional orthogonal channel gains which sum to the required threshold for the user.

In some embodiments, a method further comprises determining which users to transmit during a given time slot and determining fractional orthogonal channel gains using an optimization of fractional orthogonal channel gain user assignment which jointly maximizes a number of users each of which is assigned a respective group of one or more slots with fractional orthogonal channel gains which sum to the required threshold for the user, and maximizes the total amount of channel gain assigned subject to a maximum in each slot.

According to one broad aspect, the invention provides a method comprising transmitting packets for multiple users using a combined orthogonal channel/TDM (time division multiplexing) frame structure, with each frame containing a plurality of time slots, and a plurality of orthogonal channels during each time slot; performing a scheduling operation over a plurality of said slots in a manner which maximizes a number of users scheduled during the plurality of slots as a function of a channel estimate for each user and each slot, the scheduling operation determining which users are transmitted during each slot, for each user to be transmitted how many of the plurality of orthogonal channels each user is to be allocated, and how much of a total available transmit power is to be allocated to each user during each slot.

In some embodiments, each user has a required threshold, the method further comprising at the start of each frame starting the scheduling operation afresh, with a number of slots to be scheduled $N_s$ initially equalling a total number of slots $N_f$ being scheduled for the frame, and a number of users being scheduled $N_u$ initially equalling a total number of users to be scheduled; for current slot k, performing a scheduling operation for slot k through slot $N_f$ by: obtaining inputs to the scheduling operation comprising a CDM channel gain for each user and each slot; determining a fractional orthogonal channel gain for each user and slot by optimizing the orthogonal channel gains for each user and each slot to produce optimized orthogonal channel gains so as to maximize a number of users scheduled during the plurality of slots with a total channel gain as great as the required threshold as a function of a channel estimate for each user and each slot, with an optimized orthogonal channel gain of zero for a given slot and user meaning the user is not scheduled during the slot; allocating users having an optimized channel gain greater than zero for slot k to the current slot k using the optimized channel gain for that user and slot as the fractional orthogonal channel gain; for users having a voice packet transmitted after the current slot, decrementing $N_u$; incrementing k and decrementing $N_s=N_f-k$.

In some embodiments, a method further comprises, after each slot, decrementing the required threshold for each user scheduled by an amount equal to the optimized orthogonal channel gain assigned during the slot.

In some embodiments, a method further comprises after a given user's required threshold has been decremented to zero, and an acknowledgement of successful transmission has not been received within a specified time, resetting the given user's required threshold.

In some embodiments, the orthogonal channels are Walsh code channels.

In some embodiments, the orthogonal channels are OFDM sub-carriers.

In some embodiments, obtaining inputs to the scheduling operation comprises determining $CHE_{ik}$, a channel estimate for user i in slot k; determining $\omega_{ik}$, a number of orthogonal channels allocated to user i in slot k; determining $\xi$, the required threshold; determining $\phi_{ik}$, an orthogonal channel gain for user i in slot k.

In some embodiments, a method further comprises determining $G_i$, a processing gain for user i; determining $\beta$, a portion of power to be allocated to traffic channel; wherein determining $\phi_{ik}$ is done according to $\phi_{ik}=\xi/\alpha_{ik}$ where $\alpha_{ik}=G_i \cdot \beta \cdot CHE_{ik}$.

In some embodiments, optimizing the orthogonal channel gains for each user and each slot, with an optimized channel gain of zero for a given slot meaning the user is not scheduled during the slot comprises performing an optimization of an objective function which maximizes a number of users that will be allocated enough orthogonal channel gain over one or more slots to meet the required threshold to determine $u_{ik}$, an optimization factor for user i in slot k, where $u_{ik}>0$ if user i is allocated in slot k, and $u_{ik}=0$ otherwise subject to constraints that a summation of orthogonal channel gain of users allocated in a slot should be less than or equal to a total available channel gain, and a summation of the number of orthogonal channels of users allocated in a slot should be less than or equal to total available number of orthogonal channels per slot; determining the optimized orthogonal channel gains according to $\phi_{ik}^*=\phi_{ik}u_{ik}$ for user i in slot $$k, \phi_i = \sum_k \phi_{ik}^*.$$

In some embodiments, the objective function is:

$$Z_y = \max_y \left\{ \sum_{i=1}^{N_u} y_i \right\}$$

or an equivalent thereof such that $$\sum_{i=1}^{N_u} \phi_{ik} u_{ik} \leq 1 \qquad k = 1, 2, \ldots, N_s$$

$$\sum_{i=1}^{N_u} \omega_{ik} \Phi(u_{ik}) \leq WC_k \qquad k = 1, 2, \ldots, N_s$$

$$y_i = \Phi\left( \sum_{k=1}^{N_s} \alpha_{ik} \phi_{ik} u_{ik} - \xi \right) \quad i = 1, 2, \ldots, N_u$$

$$0 \leq u_{ik} \leq 1 \, i=1,2,\ldots,N_u, \, k=1,2,\ldots,N_s$$

$$y_i \in \{0,1\} \, i=1,2,\ldots,N_u.$$

In some embodiments, the objective function is:

$$Z_y = \min_y \left\{ -\left( \sum_{i=1}^{N_u} y_i + C_1 \xi \sum_{i=1}^{N_u} \sum_{k=1}^{N_s} u_{ik} \right) \right\}$$

or an equivalent thereof.

In some embodiments, the optimization is performed using a Lagrangean relaxation technique employing decomposition and subgradiant optimization.

BRIEF DESCRIPTION OF THE DRAWINGS

Various embodiments of the invention will now be described in further detail with reference to the attached drawings in which.

DETAILED DESCRIPTION OF THE PREFERRED EMBODIMENTS

Embodiments of the invention provide methods of scheduling voice users in a combined TDM/CDM environment. The invention will be described in the context of a combined TDM/CDM system in which time slots are arranged in frames. In each frame or slot, an orthogonal set of codes are used to provide multiple channels. In the examples described below, there are 16 time slots per frame, and the orthogonal set of codes are Walsh codes. It is to be understood that other sets of orthogonal channels could alternatively be employed in each time slot, and that other frame structures may be used which contain more or less than 16 slots per frame. For example, a set of orthogonal sub-carriers may be transmitted during each slot, this being the approach used by OFDM (orthogonal frequency division multiplexing) systems.

Figure 1:
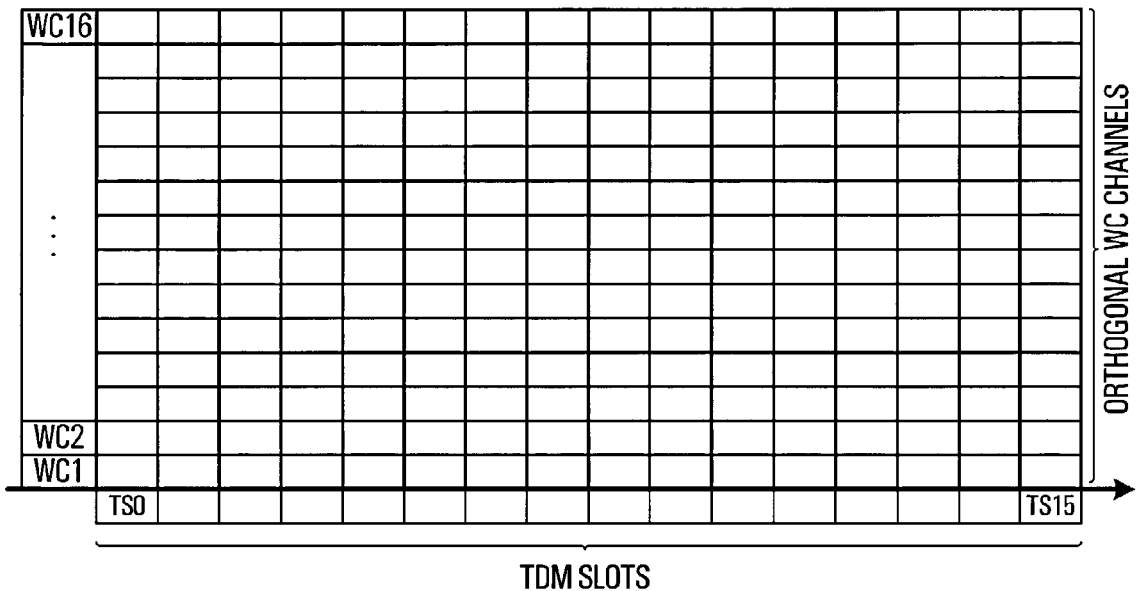
FIG. 1 is an illustration of an example TDM/CDM frame structure.
Figure 2:
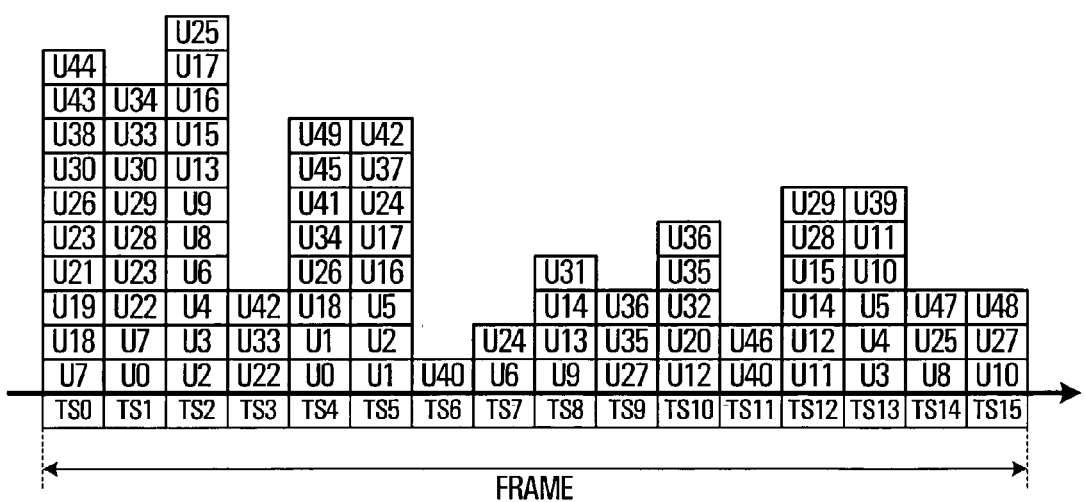
FIG. 2 is an example of how users might be scheduled during a particular frame having the structure of FIG. 1.

A TDM/CDM frame structure is shown in FIG. 1. The frame represents the resource available at the base station which is to be scheduled for multiple users. The frame is comprised of 16 TDM slots labelled TS0 through TS15. Each slot has the capability of carrying up to some number of orthogonal WC channels. These are shown stacked vertically for each slot. In the illustrated example, it is assumed that up to 16 WC$^{16}$ codes can be transmitted on each slot. These are labelled WC 1 through WC 16 although not necessarily all of these are transmitted during a given slot. An example of an actual transmit frame is shown in FIG. 2 where user identifiers U0 through U49 are stacked within each time slot. The presence of a user identifier in a given time slot means that user is allocated at least one WC during that slot. Thus, for example during TS6 only U40 is transmitting, while during TS9, U27, U35 and U36 are transmitting.

It is assumed that each voice user needs to be scheduled at least once per frame to maintain a required voice quality. Such scheduling is done on a per transmitter basis. A base station having multiple transmit sectors is assumed to have multiple transmitters, and the scheduling is performed for each sector.

It is also assumed that during a given slot, the transmitter has a finite maximum amount of total transmit power, which is to be allocated to different users by assigning them with different WC gain. For the purpose of simplification, the sum of WC gain is being normalized to one so that the WC gain value for a given user will represent the fraction of the total WC gain the given user is to be allocated.

The scheduling method determines how much WC gain should be allocated to each user in the current sector and determines which time slot should be assigned for each user, and how many users should be allocated in each time slot. The scheduling method determines how the WC gain of each user is to be divided over multiple slots in order to maximize power utilization, so as to be combined at the receiver using diversity combining.

With the methods provided, when applied in the 1×EV-DV context, users can be scheduled efficiently over slots based on the channel estimation and WC gain control, and the voice capacity of 1×EV-DV can be maximized.

Figure 3:
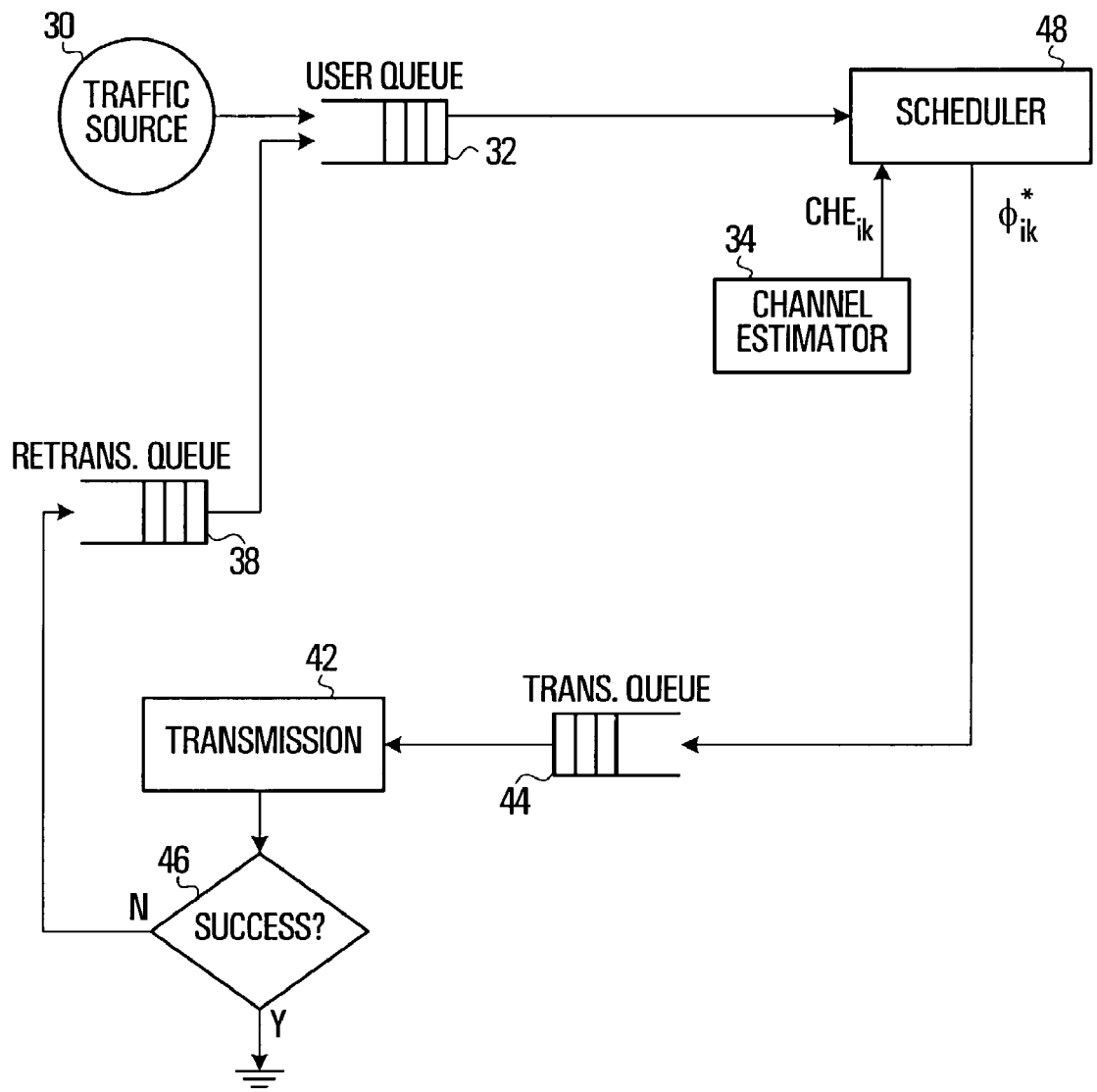
FIG. 3 is a block diagram of a packet transmitter provided by an embodiment of the invention.

Referring now to FIG. 3, shown is a block diagram of a transmitter provided by an embodiment of the invention. Shown is a traffic source 30 connected to a user queue 32. The packets in the user queue 32 are scheduled for transmission by the scheduler 48 provided by another embodiment of the invention. A channel estimator 34 is connected to the scheduler 48. The scheduler 48 is connected to a transmission queue 44. The transmission queue 44 is connected to transmission block 42 which represents functionality responsible for the actual transmission of packets. The transmission block 42 is connected through a success testing logic 46 to a retransmission queue 38 which is in turn connected back to the user queue 32. FIG. 3 only shows the details of a single user. However, with the exception of the scheduler 48 and transmission queue 44, the blocks are repeated for each user. The transmitter might form part of a basestation for example.

In operation, the traffic source 30 generates packets. Typically, for a voice user, these will be generated periodically but this is not essential. Packets generated by the traffic source 30 are added to the user queue 32. The channel estimator 34 generates channel estimates $CHE_{ik}$ for each user i and each slot k and passes these to the scheduler 48. On the basis of the channel estimates $CHE_{ik}$ and the user queues 32, the scheduler 48 determines in which slots to place which users. The output of the scheduler is a set of values $\phi_{ik}*$ representing for each slot and each user the optimized WC gain in slot k for user i. For each slot, users having non-zero values of $\phi_{ik}*$ have a packet scheduled with the appropriate WC gain by adding the packet to the transmission queue 44. The packet is then transmitted by the transmission block 42. In the event the transmission of a given packet is successful as indicated by the success testing logic 46, then the processing ends for that packet. On the other hand, in the event the transmission of a given packet is unsuccessful as indicated by the success testing logic 46, then the packet is added to the retransmission queue 38.

Channel Estimation:

As indicated above, channel estimates $CHE_{ik}$ are required as an input to the scheduler 48. A channel estimate is required for each user and for each slot in a frame and the channel estimator 34 is shown in FIG. 3 to handle this functionality. There are many known methods of developing such channel estimates, and the invention does not rely on any specific method. For example, a prediction method may be used to provide channel estimates for each slot as a function of history data maintained for each channel estimate. Other suitable methods of obtaining channel estimates include for example using the latest channel quality feedbacks or using the Weiner-Hopf method.

The CHE can be defined as $CHE_{ik}=(C/I)_{ik}=P_{ik}/\Psi_{ik}$ where $\Psi_{ik}$ is an interference power and $P_{ik}$ is a received power for user i in slot k.

Scheduler

According to an embodiment of the invention, WC gain is allowed to be split over several slots in a given frame. The key idea of this scheme is to maximize voice capacity by maximum utilization of the transmit Tx power of the transmitter. In conventional TDM scheduling approaches a given TDM slot is allocated to a given user only and the entire required transmit power is used. In this embodiment, instead the required transmit power is allowed to be distributed over several slots. This means that even though a given slot may not have enough available power to satisfy a given user's power constraint, it may be that the left over available powers of several slots combined may be used to satisfy a given user's power constraint.

Figure 4:
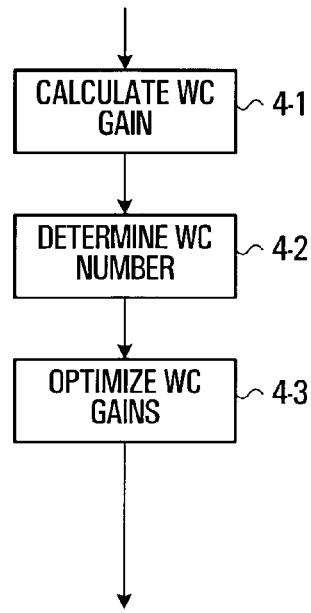
FIG. 4 is a flowchart of the functionality of the scheduler of FIG. 3, provided by an embodiment of the invention.

FIG. 4 is a high level flowchart of the operation of the scheduler 48. The first step (step 4-1) is to calculate the WC gains $\phi_{ik}$, for each user i, in slot k, with the sum of the WC gains $\phi_{ik}$ being equal to the total WC gain $\phi_i$.

The next step (step 4-2) is to determine number of WC(s).

Finally, in step 4-3 the WC gains calculated in step 4-1 are optimized to produce optimized WC gains $\phi_{ik}\star$. This involves determining optimization multipliers $u_{ik}$ using a combinatorial optimization technique and then computing the optimized WC gain values according to $\phi_{ik}*=\phi_{ik}u_{ik}$.

Figure 5:
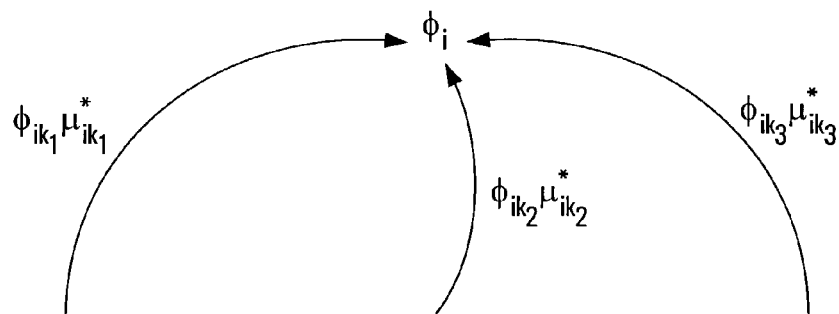
FIG. 5 is a diagram illustrating how a user's WC gain may be allocated across multiple slots in a frame.
Figure 5:
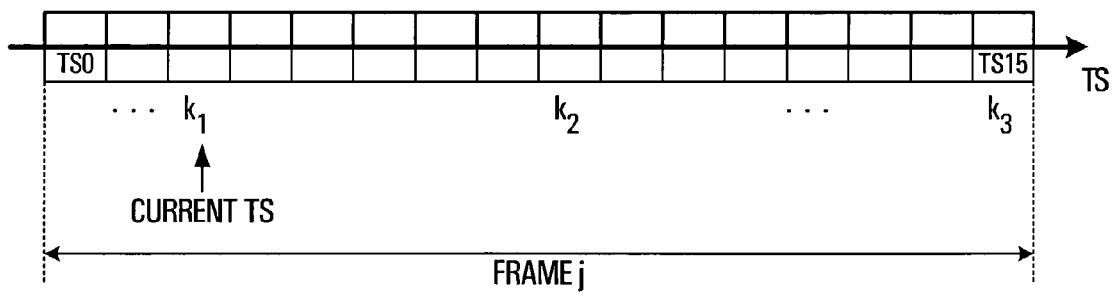

Referring now to FIG. 5, shown is an illustration of how WC gain can be split over several slots in each frame, this splitting being optimized by a mathematical model. The detailed descriptions on the model and solution algorithm provided are in the following sections. In FIG. 5, the horizontal axis is time, and a frame j is shown to contain a number of different time slots TS0 through TS15. As indicated above, each time slot has multiple orthogonal channels. In the event the algorithm determines that for a particular user i, three different slots $k_1$, $k_2$, $k_3$, are to be used, the WC gain applied to these slots is $\phi_{ik_1}*=\phi_{ik_1}u_{ik_1}$, $\phi_{ik_2}*=\phi_{ik_2}u_{ik_2}$, and $\phi_{ik_3}*=\phi_{ik_3}u_{ik_3}$ respectively.

The first step executed by the scheduling algorithm is WC gain calculation. By the definition of $E_b/N_t$ (energy per bit/ spectral density, of thermal noise plus interference):

$$(E_b/N_t)_{ik}=(W/R_i)\cdot\phi_{ik}\cdot\beta\cdot CHE_{ik}.$$

Where $G_i=(W/R_i)$ is a processing gain, $\phi_{ik}$ is the WC gain for user i (to be determined) in slot k, $\beta$ is the fraction of total transmit power allocated to voice traffic, and $CHE_{ik}$ is the channel estimate for user i in slot k. From the requirement that $(E_b/N_t)_{ik}\geq\xi=(E_b/N_t)_{req}$, where $\xi=(E_b/N_t)_{req}$ is a required value for $(E_b/N_t)$, one can write:

$$(W/R_i)\cdot\phi_{ik}\cdot\beta\cdot CHE_{ik}=(E_b/N_t)_{req}.$$

$\xi=(E_b/N_t)_{req}$ is a threshold representing a required $(E_b/N_t)$ at a receiver which is assumed constant for all users in this description, although the algorithm can easily be modified to handle different values for this threshold. Also, as described below, if priority based scheduling is employed, then two different values of required gain for each user may be employed. Then, the WC gain $\phi_{ik}$ for user i in slot k can be solved to yield:

$$\phi_{ik}=\xi/(G_i\cdot\beta\cdot CHE_{ik})=\xi[dB]-(G_i+\beta+CHE_{ik})[dB].$$

The WC gain $\phi_{ik}$ represents a minimum gain that must be allocated to the user in order that the user will receive a signal satisfying the required $(E_b/N_t)$ constraint if the packet of user i is transmitted only in slot k.

Preferably, priority based (Eb/Nt)req allocation is employed in the WC gain calculation step. The key idea of this priority scheme is to increase the probability of transmitting the current voice frame successfully for users with higher priority.

Figure 6:
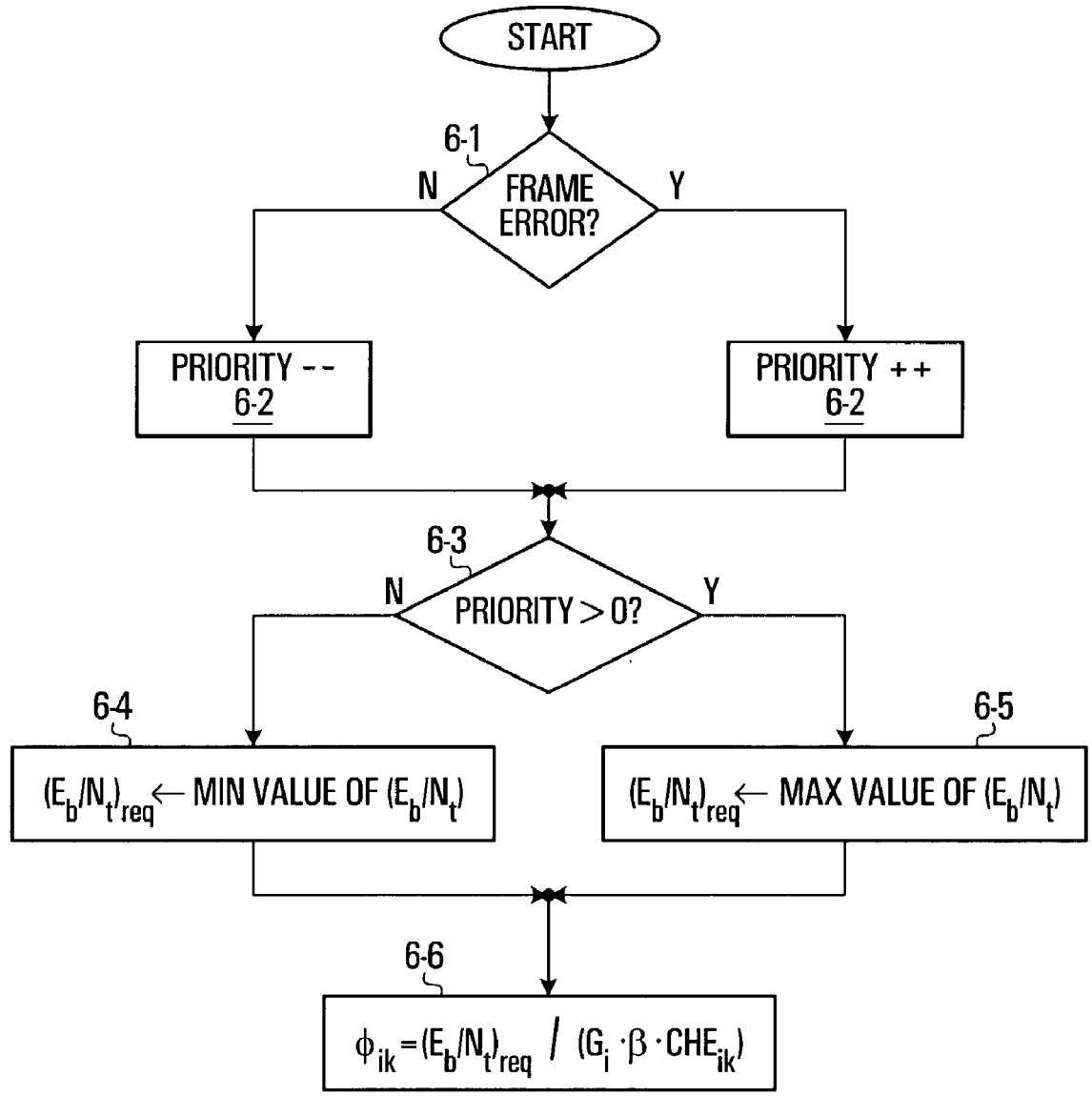
FIG. 6 is a flowchart of priority based (Eb/Nt)req allocation in WC gain calculation.

One simple way of implementing a priority scheme will now be described. The method is summarized in the flowchart of FIG. 6. If there is frame error for a given user, the priority is increased for example priority=priority+1.

At the end of each frame, users having a positive (>0) value of priority are identified, for example on a so-called "black list". At the end of every frame if a user is not in the "Black List" the priority value of the user is decreased, i.e., priority=priority−1. The priority is then taken into consideration during the calculation of the WC gains $\phi_{ik}$.

For example, the priority calculated by the priority scheme may be used as follows:

If the priority of a user is positive (0>) (yes path step 6-3) then a maximum value of (Eb/Nt)req is used (step 6-5) in calculating the WC gains $\phi_{ik}$ at step 6-6;

Else if the priority of a user is less than or equal to zero (no path step 6-3) then a minimum value of (Eb/Nt)req is used (step 6-4) in calculating the WC gains $\phi_{ik}$ at step 6-6 as described previously.

The main object of this priority scheme is to increase the probability of transmitting the current voice frame successfully for users with higher priority.

The remaining steps of the scheduler, namely step 4-2 of calculating the number of WC(s), and step 4-3 of optimize WC Gains are described below.

Mathematical Model

A complete mathematical model will now be presented. The input parameters, output parameters and decision variables are as follows (some already introduced previously):

Input Parameters $CHE_{ik}$: channel estimate for user i in slot k;

$\omega_{ik}$: Number of WC(s) allocated to user i in slot k—this is a constant for all k for a given user i representing how many WCs that user needs when transmitting;

$\xi$: Required (Eb/Nt); /★ this is typically a constant ★/

$G_i$: Processing gain for user i;

$\beta$: Portion of power to be allocated to traffic channel, e.g., 0.7—the remainder of the power is typically allocated to overhead functions;

$\phi_i$: total WC gain for user i;

$\phi_{ik}$: WC gain for user i in slot k, $\phi_{ik}=\xi/\alpha_{ik}$ where $\alpha_{ik}=G_i \cdot \beta \cdot CHE_{ik}$.

Output Parameters:

$u_{ik}$: optimization factor for user i in slot k. $u_{ik}>0$ if user i is allocated in slot k, and $u_{ik}=0$ otherwise;

$\phi_{ik}^* = \phi_{ik} u_{ik}$: optimized WC gain for user i in slot k, $$\phi_i = \sum_k \phi_{ik}^*$$

Measure (Objective Function) and Constraints

Objective: Maximize number of users allocated in slots and transmitted successfully Constraints: 1. Summation of WC gain of users allocated in a slot should be less than or equal to 1;

2. Summation of the number of WC of users allocated in a slot should be less than or equal to total available number of WC per slot.

Mathematical Formulation $$Z_y = \max_y \left\{ \sum_{i=1}^{N_u} y_i \right\} \quad /* \text{ objective function }*/ \quad (1)$$

subject to:

$$\sum_{i=1}^{N_u} \phi_{ik} u_{ik} \leq 1 \quad k=1,2,\ldots,N_s \quad /* \text{ WC gain constraints}*/$$

$$\sum_{i=1}^{N_u} \omega_{ik} \Phi(u_{ik}) \leq WC_k \quad k=1,2,\ldots,N_s \quad /* \text{ WC numbers constraints }*/$$

$$y_i = \Phi\left(\sum_{k=1}^{N_s} \alpha_{ik} \phi_{ik} u_{ik} - \xi\right) \quad i=1,2,\ldots,N_u \quad /* \text{ Eb/Nt requirement }*/$$

$$0 \leq u_{ik} \leq 1 \quad i=1,2,\ldots,N_u, \; k=1,2,\ldots,N_s \quad (5)$$

$$y_i \in \{0,1\} \quad i=1,2,\ldots,N_u \quad (6)$$

where $N_u$ is number of users to be scheduled, $N_s$ is number of slots over which scheduling is being performed for this iteration, $WC_k$ is total available number of WC in slot k, $u_{ik}$: optimization factor for user i in slot k. $u_{ik}>0$ if user i is allocated in slot k, and $u_{ik}=0$ otherwise; $\phi_{ik} u_{ik}$ is the actual Walsh code gain allocated for user i in slot k, and where $$\Phi(x) = \begin{cases} 1 & \text{if } x > 0 \\ 0 & \text{otherwise} \end{cases}.$$

Objective function (1) represents that the number of users satisfying the condition of $$\sum_{k=1}^{N_s} G_i \beta CHE_{ik} \phi_{ik} u_{ik} > \xi$$

is to be maximized.

Constraint (2) represents that the total WC gains allocated to users who are to be assigned to the same slot should be less than equal to one, where a WC gain for a user will be split over some slots by $u_{ik}$.

Constraint (3) represents that the total number of WCs for users being assigned in a slot should be less than or equal to the total available WC number for that slot.

Constraint (4) represents those users satisfying Eb/Nt requirement $$\left(i.e., \sum_{k=1}^{N_s} G_i \beta CHE_{ik} \phi_{ik} u_{ik} > \xi\right)$$

are to be scheduled (users not satisfying the condition may be scheduled too).

Constraints (5) and (6) are decision variable constraints. We let $u_{ik}$ be continuous variable in order to split a WC gain over some slots for soft combining and incremental redundancy, and to maximize power resource utilization.

The above problem is a MIP (Mixed Integer Programming) problem, which is NP-hard. The above math programming is difficult to solve since $\Phi(x)$ is not a linear function. It can however be converted to a linear form.

(2)

(3)

(4)

The above objective function (1) is equivalent to:

$$Z_y = \min_y \left\{ -\sum_{i=1}^{N_u} y_i \right\}$$

Preferably, an additional term $$\xi \sum_{i=1}^{N_u} \sum_{k=1}^{N_s} u_{ik}$$

is added to the objective function in order to obtain better solution and for the efficiency of our algorithm. This added term represents a constant multiplied by the fraction of the total available WC gain which is allocated over the slots being scheduled. Any term which is representative of this fraction may be employed, and this may not necessarily take the form of the above example. This yields a revised objective function:

$$Z_{y,u} = \min_{y,u}\left\{-\left\{\sum_{i=1}^{N_u} y_i + \xi \sum_{i=1}^{N_u}\sum_{k=1}^{N_s} u_{ik}\right\}\right\}$$

The above problem can be converted (see appendix A) to the following problem:

Problem[Scheduler( )]:
Minimize:

$$Z_{y,u,x} = \min_{y,u,x}\left\{-\left\{C_1\sum_i y_i + C_2\xi\sum_i\sum_k u_{ik}\right\} + K_1\sum_i\sum_k x_{ik} + K_2\sum_i x_i\right\} \quad (7)$$

subject to:

$$\sum_i \phi_{ik} u_{ik} \leq 1 \quad \forall k \quad (8)$$

$$\sum_i \omega_{ik} x_{ik} \leq WC_k \quad \forall k \quad (9)$$

$u_{ik} \leq M_1 x_{ik} \forall i,k$ (10)

$y_i = x_i \forall i$ (11)

$$\sum_k u_{ik} - 1 \leq M_2 x_i \quad \forall i \quad (12)$$

$1 \geq u_{ik} \geq 0 \forall i,k$ $y_i \in \{0,1\}, x_{ik} \in \{0,1\}, x_i \in \{0,1\} \forall i,k$ where $C_1(>K_2)$, $C_2$, $K_1(=K_2)$, $K_2$ are coefficients, $M_1=1$, $0<M_2<1$.

Note that we have replaced $\alpha_{ik}\phi_{ik}$ with $\xi$ in Problem[Scheduler( )] according to the definition of $\phi_{ik}=\xi/\alpha_{ik}$. In (10), if $u_{ik}=0$ then $x_{ik}$ may be 0 or 1 but it will be 0 due to minimizing $$K_1 \sum_i \sum_k x_{ik}$$

in the objective function. In (12), if $$\sum_k u_{ik} - 1 \leq 0 \left(\sum_k \alpha_{ik}\phi_{ik}u_{ik} - \xi \leq 0\right)$$

then $x_i$ may be 0 or 1 but it will be 0 due to minimizing $$K_2 \sum_i x_i$$

in the objective function.

Complexity
Problem[Scheduler( )] is a sort of MIP (Mixed Integer Programming) and NP-hard problem. However, every term is linear, so the problem can be solved by linear or integer programming techniques.

Scheduling Algorithm
In this section, the detailed procedures of the algorithm are introduced.

Inputs:
1. Number of slots remaining, $N_s$
2. Number of users remaining, $N_u$
3. $CHE_{ik}$ (Calculate $\phi_{ik}$)
4. Vocoder rates (Calculate $\omega_{ik}$ and $\alpha_{ik}$)

Outputs:
1. $\{u_{ik} \forall i,k\}$
2. $\phi_{ik}^* = \phi_{ik} u_{ik}^*$
3. $\omega_{ik}$ Step 1) Get Inputs
Step 2) Solve problem for $\{u_{ik} \forall i,k\}$
Step 3) Allocate users having $u_{ik}>0$ to the current slot k with $\phi_{ik}u_{ik}$ WC gain;
Step 4) Update $N_s$ and $N_u$
Step 5) Goto Step 1

At the start of each frame the whole scheduling process starts afresh. At that time, $N_s$ will equal the total number of slots being scheduled for a frame. The scheduling algorithm is repeated every slot with $N_s$ being decremented each iteration. Similarly, at the start of each frame $N_u$ will equal the total number of users to be scheduled. Then, as users have their voice packets successfully transmitted $N_u$ is decremented. More specifically, for users having a voice packet transmitted, meaning that one or more slots have been assigned, transmitted for the user and an acknowledgement received $N_u$ is decremented. In some embodiments, for each user scheduled, the target gain for the user is decremented for use in subsequent slots. In some embodiments, if, after a user's target gain has been allocated over one or more slots, and an acknowledgement is not received within an acceptable round trip delay, preferably the user's target gain is reset to the initial target value.

An Example Implementation is Presented in Appendix C.

In the example implementation, Lagrangian optimization is employed. Any suitable optimization method may be employed, such as branch and bound, Primal dual, Ellipsoid, Polyhedral methods, etc.

Numerous modifications and variations of the present invention are possible in light of the above teachings. It is therefore to be understood that within the scope of the appended claims, the invention may be practised otherwise than as specifically described herein.

Appendix A: Problem Conversion

In this appendix, conversion of φ(x) to a linear form is described.

Let $x_{ik} = \Phi(u_{ik}) \forall i,k$. Then, $$x_{ik} = \begin{cases} 1 & \text{if } u_{ik} > 0 \\ 0 & \text{if } u_{ik} = 0 \end{cases}$$

by the definition of $\Phi(\cdot)$ and since $u_{ik} \geq 0$.

As equivalent constraints, we can express it as below:

$$u_{ik} \leq M_1 x_{ik} \forall i,k \quad (A1)$$

where $M_1$ is a constant value called a "Big M", which is larger than or equal to any value of $u_{ik}$. In (A1), if $u_{ik} > 0$ then $x_{ik}$ should be equal to 1 and if $u_{ik} = 0$ then $x_{ik}$ may be 0 or 1 but it will be 0 due to the associated objective function term. We set $M_1 = 1$ since $1 \geq u_{ik} \geq 0$.

Hence, (3) can be converted to the following equivalent constraints:

$$\sum_i \omega_{ik} x_{ik} \leq WC_k \quad \forall k$$

$$u_{ik} \leq M_1 x_{ik} \forall i,k$$

$$x_{ik} \in \{0,1\} \forall i,k$$

$$\text{Let } x_i = \Phi\left(\sum_k u_{ik} - 1\right) \forall i.$$

$$\text{Then, } x_i = \begin{cases} 1 & \text{if } \sum_k u_{ik} - 1 > 0 \\ 0 & \text{if } \sum_k u_{ik} - 1 \leq 0 \end{cases} \text{ by the definition of } \Phi(\cdot).$$

As equivalent constraints, we can express it as below:

$$\sum_k u_{ik} - 1 \leq M_2 x_i \quad \forall i \quad (A2)$$

where $M_2$ is a constant value called a "Big M", which is larger than any value of $$\sum_k u_{ik} - 1.$$

In (A2), if $$\sum_k u_{ik} - 1 > 0$$

then $x_i$ should be equal to 1 and if $$\sum_k u_{ik} - 1 \leq 0$$

then $x_i$ may be 0 or 1 but it will be 0 due to the associated objective function term. We set $0 < M_2 \ll 1$.

Hence, (4) can be converted to the following equivalent constraints:

$$y_i = x_i \forall i$$

$$\sum_k u_{ik} - 1 \leq M_2 x_i \quad \forall i$$

$$x_i \in \{0,1\} \forall i$$

Appendix-B: Solution Approach

A.1 Algorithm for the Relaxed Problem

Lagrangean relaxation technique (decomposition and subgradient optimization) is applied.

Since (10) and (12) are constraints that make the problem difficult, we relax (10) and (12).

RP(Relaxed Problem):

$$Z_{y,u,x}(\lambda) = \min_{y,u,x} \left\{ \begin{array}{l} -\left\{C_1 \sum_i y_i + C_2 \xi \sum_i \sum_k u_{ik}\right\} + K_1 \sum_i \sum_k x_{ik} + K_2 \sum_i x_i \\ + \sum_i \sum_k \lambda_{ik}(u_{ik} - M_1 x_{ik}) + \sum_i \lambda_i \left(\sum_k u_{ik} - 1 - M_2 x_i\right) \end{array} \right\}$$

s.t.

$$\sum_i \phi_{ik} u_{ik} \leq 1 \quad \forall k$$

$$\sum_i \omega_{ik} x_{ik} \leq WC_k \quad \forall k$$

$$y_i = x_i \forall i$$

$$1 \geq u_{ik} \geq 0 \forall i,k$$

$$y_i \in \{0,1\}, x_{ik} \in \{0,1\}, x_i \in \{0,1\} \forall i,k$$

where $\lambda_{ik}, \lambda_i \geq 0 \forall i,k$ are Lagrangean multipliers.

The above problem can be decomposed as follows:

Subproblem (y,x), Subproblem (u), and Subproblem (x).

Subproblem(y,x): /★ subproblem having only y,x ★/

$$Z_y(\lambda)\min_{y,x}\left\{-C_1\sum_i y_i - M_2\sum_i \lambda_i x_i + K_2\sum_i x_i\right\}$$

s.t.

$y_i = x_i \forall i$ $y_i, x_i \in \{0,1\} \forall i$

This subproblem can be decomposed further for i as below:

Subp(y,x:i):

$$Z_y(\lambda:i) = \min_{y,x\in\{0,1\}}\{-C_1 y_i + (K_2 - M_2\lambda_i)x_i\} \, s.t. \, y_i = x_i$$

Subproblem(u): /★ subproblem having only u ★/

$$Z_u(\lambda) = \min_u\left\{-C_2\xi\sum_i\sum_k u_{ik} + \sum_i\sum_k \lambda_{ik}u_{ik} + \sum_i\sum_k \lambda_i u_{ik}\right\}$$

s.t.

$$\sum_i \phi_{ik}u_{ik} \le 1 \, \forall \, k$$

$1 \ge u_{ik} \ge 0 \forall i,k$

This subproblem can be decomposed further for k as below:

Subp(u:k):

$$Z_u(\lambda:k)\min_{0\le u\le 1}\left\{\sum_i(\lambda_{ik} + \lambda_i - C_2\xi)u_{ik}\right\} \, s.t. \, \sum_i \phi_{ik}u_{ik} \le 1$$

This is a LP problem. We can use Simplex algorithm. However, we propose a simpler algorithm than Simplex algorithm. User i having minimum value of $(\lambda_{ik}+\lambda_i-C_2\xi)$ and minimum value of $\phi_{ik}$ should be chosen. If there are some users such that $(\lambda_{ik}+\lambda_i-C_2\xi)<0$, then the user i having minimum value of $(\lambda_{ik}+\lambda_i-C_2\xi)/\phi_{ik}$ should be chosen firstly. If there are only users such that $(\lambda_{ik}+\lambda_i-C_2\xi)\ge 0$, then the user i having minimum value of $(\lambda_{ik}+\lambda_i-C_2\xi)\phi_{ik}$ should be chosen firstly. In the constraints, the contribution of the user i chosen is $\phi_{ik}$, and if the right hand side (RHS) is greater than the $\phi_{ik}$, then the RHS should be changed to $1-\phi_{ik}$ after choosing the user i. The value of $u_{ik}$ will be equal to 1 or be partial value that is less than 1. These steps are repeated.

Subproblem(x): /★ subproblem having only x ★/

$$Z_x(\lambda) = \min_x\left\{K_1\sum_i\sum_k x_{ik} - \sum_i\sum_k \lambda_{ik}M_1 x_{ik}\right\}$$

s.t.

$$\sum_i \omega_{ik}x_{ik} \le WC_k \, \forall \, k$$

$x_{ik} \in \{0,1\} \forall i,k$

This problem can be decomposed for k as below:

Subp(x:k):

$$Z_x(\lambda:k) = \min_{x\in\{0,1\}}\left\{\sum_i(K_1 - \lambda_{ik}M_1)x_{ik}\right\} \, s.t. \, \sum_i \omega_{ik}x_{ik} \le WC_k$$

This problem is a 0-1 knapsack problem since $x_{ik}$ are 0-1 variables. We can solve this problem by a knapsack algorithm. However, Subp(x:k) is similar to Subp(u:k), so that we use our algorithm developed for Subproblem(u) with slight modification.

A.2 Algorithm for Obtaining Feasible Solutions of Problem [Scheduler( )]

A heuristic procedure is needed to obtain good solutions that are feasible to Problem[Scheduler( )] by using the solutions of RP. Only one case (i.e., $u_{ik}>0$ and $x_{ik}=0$) is infeasible to (10) and only one case (i.e., $$\sum_k u_{ik} > 0$$

and $x_i=0$) is infeasible to (12) in $(\underline{Y},\underline{U},\underline{X})$. It is feasible to (10) and (12) as defined in Appendix $\overline{C}$.

Appendix C Pseudo-Code procedure Near optimal algorithm for Problem[Scheduler( )]: NOPTALGO( )

begin while GAP(%)<ε do set multiplier $\lambda=\{\lambda_i,\lambda_{ik} \forall i,k\}$ be an initial value solve Subproblem(y,x) and get the solution $\underline{Y}=\{y_i \, \forall i\}$ by procedure Subproblem(y,x):

solve Subproblem(u) and get the solution $\underline{U}=\{u_{ik} \, \forall i,k\}$ by procedure Subproblem(u):

solve Subproblem(x) and get the solution $\underline{X}=\{x_{ik} \, \forall i,k\}$ by procedure Subproblem(x):

set the lower bound be $$LB(\lambda) = Z_{y\in \underline{Y}}(\lambda) + Z_{u\in \underline{U}}(\lambda) + Z_{x\in \underline{X}}(\lambda) - \sum_{i=1}\lambda_i$$

get the solution $(\overline{Y},\overline{U},\overline{X})$ of Problem[Scheduler( )] by MAKEFS( )

set the upper bound be UB=$Z_{y\in \overline{Y}, x\in \overline{X}}$
solve $$Z(\lambda^*) = \max_\lambda Z_{y,u,x}(\lambda)$$

for optimizing $\lambda$ by the subgradient optimization technique
  set GAP(%)=(UB−LB($\lambda$))/UB×100
  end {while}
  get near optimal solutions U*={$u_{ik}$*∀i,k}
  end {Near optimal algorithm for Problem[Scheduler( )]: NOPTALGO( ) }
  procedure Subproblem(x)
    for k=1,2, . . . , $N_s$ do Define $I_{<0}=\{i|(K_1-\lambda_{ik}M_1)<0, i=1,2,\ldots N_u\}$ and $I_{>0}=\{i|(K_1-\lambda_{ik}M_1)\geq 0, i=1,2,\ldots N_u\}$.

set RHS=WC and $x_{ik}$=0 for i∈I
    while (RHS>0) do
      if ($I_{<0}\neq\emptyset$) then find $i^0=argmin\{i|(K_1-\lambda_{ik}M_1)/\omega_{ik}, i\in I_{<0}\}$ if (RHS$\geq\omega_{i^0 k}$) then
    set $x_{i^0 k}$=1
    update $I_{21\ 0}=I_{<0}-\{i^0\}$ and RHS=RHS−$\omega_{i^0 k}$
  else RHS=RHS−$\omega_{i^0 k}$ end {if}
  else if ($I_{>0}\neq\emptyset$)

find $i^0=argmin\{i|(K_1-\lambda_{ik}M_1)\omega_{ik}, i\in I_{>0}\}$ if (RHS$\geq\omega_{i^0 k}$) then
    set $x_{i^0}k$=1
    update $I_{>0}=I_{>0}-\{i^0\}$ RHS=RHS−$\omega_{i^0 k}$
    else RHS=RHS−$\omega_{i^0 k}$ end {if}
  end {if}
  end {while}
  end {for k}
  get the solution $\underline{X}$={$x_{ik}$ ∀i,k}
  end {Subproblem̄(x)}
  procedure Subproblem(u)
    for k=1,2, . . . , $N_s$ do Define $I_{<0}=\{i|(\lambda_{ik}+\lambda_i-C_2\xi)<0, i=1,2,\ldots N_u\}$ and $I_{>0}=\{i|(\lambda_{ik}+\lambda_i-C_2\xi)\geq 0, i=1,2,\ldots N_u\}$.

set RHS=1 and $u_{ik}$=0 for i∈I
  while ((RHS>0) and ($I_{<0}\neq\emptyset$ or $I_{>0}\neq\emptyset$)) do
    if ($I_{<0}\neq\emptyset$) then find $i^0=argmin\{i|(\lambda_{ik}+\lambda_i-C_2\xi)/\phi_{ik}, i\in I_{<0}\}$ if (RHS$\geq\phi_{i^0 k}$) then
  set $u_{i^0 k}$=1/★ maximally allocated ★/
  update $1_{<0}=I_{<0}-\{i^0\}$ and RHS=RHS−$\phi_{i^0 k}$
else if (0<RHS<$\phi_{i^0 k}$) then
  set $u_{i^0 k}$=RHS/$\phi_{i^0 k}$/★ partially allocated ★/
  update $I_{<0}=I_{<0}-\{i^0\}$ and RHS=RHS−$\phi_{i^0 k}$ end {if}
else if ($I_{>0}\neq\emptyset$)

find $i^0=argmin\{i|(\lambda_{ik}+\lambda_i-C_2\xi)\phi_{ik}, i\in I_{>0}\}$ if (RHS$\geq\phi_{i^0 k}$) then
  set $u_{i^0 k}$=1/∅ maximally allocated ∅/
  update $I_{>0}=I_{>0}-\{i^0\}$ and RHS=RHS−$\phi_{i^0 k}$
else if (0<RHS<$\phi_{i^0 k}$) then
  set $u_{i^0 k}$=RHS/$\phi_{i^0 k}$/∅ partially allocated ∅/
  update $I_{>0}=I_{>0}-\{i^0\}$ and RHS=RHS−$\phi_{i^0 k}$
end {if}
end {if}
end {while}
end {for k}
get the solution U={$u_{ik}$ ∀i,k}
end {Subproblem̄(u)}
procedure Subproblem(y,x)
  for i=1,2, . . . , $N_u$ do
  if ($-C_1+K_2-M_2\lambda_i$)<0 then
  set $y_i=x_i=1$
  else
  set $y_i=x_i=0$
  end {for}
  get the solution $\underline{Y}=\{y_i\ \forall i\}$ and $\underline{X}=\{x_i\ \forall i\}$
end {Subproblem̄(y,x)}
procedure Infeasible solution to feasible solution: MAKEFS( )
begin
  get U={$u_{ik}$ ∀i,k}, $\underline{X}$={$x_{ik}$ ∀i,k} and $\underline{X}$={$x_i$ ∀i} from RP
  set ($\overline{IY}, \overline{IU}, \overline{IX}$)=($\underline{Y}, U, \underline{X}$)
  for i=1,2, . . . , $N_u$ do
  /★ these solutions are infeasible to (10) ★/
  for k=1,2, . . . , $N_s$ do
  if ($u_{ik}$>0 and $x_{ik}$=0) then
  set $u_{ik}$=0 in $\overline{IU}$ /★ make it be feasible to (10) ★/
  end {if}
  end {for k}
  /★ these solutions are infeasible to (12) ★/
  if $$\left(\sum_k u_{ik} < 1\right)$$

then
  set $x_i=y_i$=0 in $\overline{IX}$ and $\overline{IY}$ /★ make it be feasible to (12) ★/
else{

$$/* \sum_k u_{ik} \geq 1\ */$$

Define K={$k|u_{ik}$ in $\overline{IU}$}
if($x_i=y_i$=0) then
  set RHS=$M_2$−1
else /★ $x_i=y_i$=1★/
  set RHS=$M_2$+1
end {if}
while ((RHS>0)&&(K≠∅)) do /★ make it be feasible to (12) ★/ find $k^0=argmax\{k\in K|u_{ik}$ in $\overline{IU}\}$ if (RHS$\geq u_{ik^0}$) then save $u_{ik}^o$ in $\overline{IU}$
else if ($0<RHS<u_{ik}^o$) then
set $u_{ik}^o$=RHS
save $u_{ik}^o$ in $\overline{IU}$
end {if}
update RHS=RHS−$u_{ik}^o$
set K=K−{$k^o$}
end {while}
set $u_{ik}$=0 for all k≠$k^o$s in $\overline{IU}$
end {if}
end {for i}
/★ the following procedure is necessary because there may be unscheduled users, i.e., $u_{ik}$=0
even though some slot have slack capacity in WC gain and WC number perspective ★/
for k=1,2, . . . , $N_s$ do
calculate $$s_1(k) = 1 - \sum_i \phi_{ik} u_{ik}$$

with $u_{ik}$ in $\overline{IU}$ /★ slack capacity in WC gain at slot k ★/
calculate $$s_2(k) = WC_k - \sum_i \omega_{ik} x_{ik}$$

with $x_{ik}$ in $\overline{IU}$ /★ slack capacity in WC number at slot k ★/
end {for k}
find user i such that $u_{ik}$=0/★ this user may be scheduled if there are slack capacity ★/
Let $I_m$={i|$u_{ik}$=0} /★ unscheduled user set ★/
   for i∈$I_m$ do
if ($x_i$=1) then RHS=$M_2$+1/★ in constraint (12) ★/
else RHS=1
end {if}
for k=1,2, . . . , $N_s$ do
if($s_1(k)$>0 and ($\omega_{ik}$<$s_2(k)$>0)) then
set $u_{ik}$=min($s_1(k)/\phi_{ik}$,1) in $\overline{IU}$/★ schedule this user at slot k ★/
set $x_{ik}$=1 in $\overline{IX}$ /★ due to constraint (10) ★/
update $s_1(k)$ and $S_2(k)$
check $$\sum_k u_{ik} \le RHS$$

/★ check for constraint (12) ★/
end {if}
end {for k}
end {for i}
set (Y, U, X)=($\overline{IY}$, $\overline{IU}$, $\overline{IX}$)/★ (Y, U, X) is a feasible to Problem[Scheduler( )] ★/
end {Infeasible solution to feasible solution: MAKEFS( )}

The invention claimed is:

1. A combined CDM/TDM (code division multiplexing/time division multiplexing) transmitter comprising:
a fractional slot assignment scheduler to:
for at least one packet, determine fractional CDM channel gains, a sum of the fractional CDM channel gains for a respective packet of the at least one packet being a CDM channel gain for the respective packet;
assign the fractional CDM channel gains to multiple slots within a scheduling period for each of the at least one packet such that a sum of the fractional CDM gains assigned each packet over the multiple slots within the scheduling period meet a required threshold.

2. The transmitter of claim 1 wherein the fractional slot assignment scheduler determines for each slot, which users are to be assigned a fractional CDM gain for the slot, and determines the fractional CDM channel gains using an optimization of fractional CDM channel gain and user assignment which maximizes a number of users each of which is assigned a respective group of one or more slots with fractional CDM channel gains which sum to the required threshold for the user.

3. The transmitter of claim 1 wherein the fractional slot assignment scheduler determines for each slot, which users are to be assigned a fractional CDM gain for the slot, and determines the fractional CDM channel gains using an optimization of fractional CDM channel gain and user assignment which jointly maximizes a number of users each of which is assigned a respective group of one or more slots with fractional CDM channel gains which sum to the required threshold for the user, and maximizes the total amount of CDM channel gain assigned subject to a maximum in each slot.

4. The transmitter of claim 1 wherein the fractional slot assignment scheduler;
at the start of each frame starts the scheduling operation afresh, with the scheduling period having a number of slots to be scheduled $N_s$ initially equalling a total number of slots $N_f$ being scheduled for the frame, and a number of users being scheduled $N_u$ initially equalling a total number of users to be scheduled;
for current slot k, performs a scheduling operation for slot k through slot $N_f$ by:
obtains inputs to the scheduling operation comprising a CDM channel gain for each user and each slot;
determines the fractional CDM channel gains by optimizing the CDM channel gains for each user and each slot to produce optimized CDM channel gains so as to maximize a number of users scheduled during the plurality of slots with a total CDM channel gain as great as the required threshold function of channel estimates for each user and each slot, with an optimized CDM channel gain of zero for a given slot and user meaning the user is not scheduled during the slot;
allocates users having an optimized CDM channel gain greater than zero for slot k to the current slot k using the optimized CDM channel gain for that user and slot as the fractional CDM channel gain;
for users having a voice packet transmitted after the current slot, decrements $N_u$;
increments k and decrements $N_s$=$N_f$−k.

5. The transmitter of claim 4 wherein the fractional slot assignment scheduler, after each slot, decrements the required threshold for each user scheduled by an amount equal to the optimized CDM channel gain assigned during the slot.

6. The transmitter of claim 5 wherein the fractional slot assignment scheduler:
after a given user's required threshold has been decrernented to zero, and an acknowledgement of successful transmission has not been received within a specified time, resets the given user's required threshold.

7. The transmitter of claim 1 wherein the CDM channels are Walsh code channels.

8. The transmitter of claim 4 wherein inputs to the scheduling operation comprise:
   a channel estimator determining $CHE_{ik}$, a channel estimate for user i in slot k;
   the fractional slot assignment scheduler determining $\omega_{ik}$, a number of CDM channels allocated to user i in slot k;
   the fractional slot assigmnent scheduler determining $\xi$, the required threshold;
   the fractional slot assignment scheduler determining $\phi_{ik}$, a CDM channel gain for user i in slot k.

9. The transmitter of claim 8 wherein the fractional slot assignment scheduler:
   determines $G_i$, a processing gain for user i;
   determines $\beta$, a portion of power to be allocated to traffic channel;
   wherein determining $\phi_{ik}$ is done according to $\phi_{ik}=\xi/\alpha_{ik}$ where $\alpha_{ik}=G_i \cdot \beta \cdot CHE_{ik}$.

10. A transmitter according to claim 9 wherein optimizing the CDM channel gains for each user and each slot, with an optimized channel gain of zero for a given slot meaning the user is not scheduled during the slot comprises:
    the fractional slot assignment scheduler:
      performing an optimization of an objective function which maximizes a number of users that will be allocated enough CDM channel gain over one or more slots to meet the required threshold to determine $u_{ik}$, an optimization factor for user i in slot k, where $u_{ik}>0$ if user i is allocated in slot k, and $u_{ik}=0$ otherwise subject to constraints that a summation of CDM channel gain of users allocated in a slot should be less than or equal to a total available CDM channel gain, and a summation of the number of CDM channels of users allocated in a slot should be less than or equal to total available number of CDM channels per slot;
      determining optiniized CDM channel according to $\phi_{ik}^*=\phi_{ik}u_{ik}$ for user i in slot k.

11. The transmitter according to claim 10 wherein the optimization is performed using a Lagrangean relaxation technique employing decomposition and subgradiant optimization.

12. A combined orthogonal ehannel/TDM system comprising:
    a tramsmitter to transmit using a plurality of orthogonal channels during each of sequence of time division mulitpiexed slots;
    the transmitter:
      for at least one packet, determining fractional orthogonal channel gains, a sum of the fractional orthogonal channel gains for a respective packet of the at least one packet being an orthogonal channel gain for the respective packet; and
      assigning the fractional orthogonal channel gains to multiple slots within a scheduling period for each of the at least one packet such that a sum of fractional orthogonal channel gains assigned each packet over the multiple slots within the scheduling period meet a required threshold;
    a receiver to perform diversity combining of fractionally assigned slots.

13. The system of claim 12 wherein the orthogonal channels are CDM channels.

14. The system of claim 12 wherein the orthogonal channels are OFDM sub-carriers.

15. A method of scheduling users in a combined orthogonal channel/TDM (time division multiplexing) frame structure, with each frame containing a plurality of time slots, and a plurality of orthogonal channels during each tune slot, each user having a required threshold, the method comprising:
    determining for at least one user's packet, fractional orthogonal channel gains, a sum of the fractional orthogonal channel gains for a respective user's packet of the at least one user's packet being an orthogonal channel gain for the respective packet;
    scheduling the at least one user's packet to be transmitted during a first slot of said plurality of time slots and to be retransmitted during at least one second slot of said plurality of time slots with a fractional orthogonal channel gain during each of the first slot and the at least one second slot being less than a target transmit power for the user.

16. The method of claim 15 wherein the orthogonal channels are CDM channels.

17. The method of claim 15 wherein the orthogonal channels are OFDM sub-carriers.

18. A method according to claim 15 further comprising:
    determining which users to transmit during a given time slot and determining fractional orthogonal channel gains using an optimization of fractional orthogonal channel gain user assignment which maximizes a number of users each of which is assigned a respective group of one or more slots with fractional orthogonal channel gains which sum to the required threshold for the user.

19. A method according to claim 15 further comprising:
    determining which users to transmit during a given time slot and determining fractional orthogonal channel gains using an optimization of fractional orthogonal channel gain user assigmuent which jointly maximizes a number of users each of which is assigned a respective group of one or more slots with fractional orthogonal channel gains which sum to the required threshold for the user, and maximizes the total amount of channel gain assigned subject to a maximum in each slot.

20. A method comprising:
    transmitting packets for multiple users using a combined orthogonal channel/TDM (time division multiplexing) frame structure, with each frame containing a plurality of time slots, and a plurality of orthogonal channels during each time slot;
    performing a scheduling operation over a plurality of said slots in a manner which maximizes a number of users scheduled during the plurality of slots as a function of a channel estimate for each user and each slot, the scheduling operation determining which users are transmitted during each slot, for each user to be transmitted how many of the plurality of orthogonal channels each user is to be allocated, and how much of a total available transmit power is to be allocated to each user during each slot, and the scheduling operation further for at least one packet, determining fraction orthogonal channel gains, a sum of the fractional orthogonal channel gains for a respective packet of the at least one packet being an orthogonal channel gain for the respective packet and assigning the fractional orthogonal channel gains to multiple slots within a scheduling period for each of the at least one packet such that a sum of fractional orthogonal gains assigned each packet over the multiole slots within the scheduling period meet a required threshold for successful transmission.

21. A method according to claim 20 wherein each user has a required threshold, the method further comprising:

at the start of each frame starting the scheduling operation afresh, with a number of slots to be scheduled $N_s$ initially equalling a total number of slots $N_f$ being scheduled for the frame, and a number of users being scheduled $N_u$ initially equalling a total number of users to be scheduled;

for current slot k, performing a scheduling operation for slot k through slot $N_f$ by:

obtaining inputs to the scheduling operation comprising a CDM channel gain for each user and each slot;

determining a fractional orthogonal channel gain for each user and slot by optimizing the orthogonal channel gains for each user and each slot to produce optimized orthogonal channel gains so as to maximize a number of users scheduled during the plurality of slots with a total channel gain as great as the required threshold as a function of a channel estimate for each user and each slot, with an optimized orthogonal channel gain of zero for a given slot and user meaning the user is not scheduled during the slot;

allocating users having an optimized channel gain greater than zero for slot k to the current slot k using the optimized channel gain for that user and slot as the fractional orthogonal channel gain;

for users having a voice packet transmitted after the current slot, decrementing $N_u$;

incrementing k and decrementing $N_s = N_f - k$.

22. A method according to claim 21 further comprising after each slot, decrementing the required threshold for each user scheduled by an amount equal to the optimized orthogonal channel gain assigned during the slot.

23. A method according to claim 21 further comprising:

after a given user's required threshold has been decremented to zero, and an acknowledgement of successful transmission has not been received within a specified time, resetting the given user's required threshold.

24. A method according to claim 21 wherein the orthogonal channels are Walsh code channels.

25. A method according to claim 21 wherein the orthogonal channels are OFDM sub-carriers.

26. A method according to claim 21 wherein obtaining inputs to the scheduling operation comprises:

determining $CHE_{ik}$, a channel estimate for user i in slot k;

determining $\omega_{ik}$, a number of orthogonal channels allocated to user i in slot k;

determining $\xi$, the required threshold;

determining $\phi_{ik}$, an orthogonal channel gain for user i in slot k.

27. A method according to claim 26 further comprising:

determining $G_i$, a processing gain for user i;

determining $\beta$, a portion of power to be allocated to traffic channel;

wherein determining $\phi_{ik}$ is done according to $\phi_{ik} = \xi / \alpha_{ik}$ where $\alpha_{ik} = G_i \cdot \beta \cdot CHE_{ik}$.

28. A method according to claim 26 wherein optimizing the orthogonal channel gains for each user and each slot, with an optimized channel gain of zero for a given slot meaning the user is not scheduled during the slot comprises:

performing an optimization of an objective function which maximizes a number of users that will be allocated enough orthogonal channel gain over one or more slots to meet the required threshold to determine $u_{ik}$, an optimization factor for user i in slot k, where $u_{ik} > 0$ if user i is allocated in slot k, and $u_{ik} = 0$ otherwise subject to constraints that a summation of orthogonal channel gain of users allocated in a slot should be less than or equal to a total available channel gain, and a summation of the number of orthogonal channels of users allocated in a slot should be less than or equal to total available number of orthogonal channels per slot;

determining the optimized orthogonal channel gains according to $\phi_{ik}^* = \phi_{ik} u_{ik}$ for user i in slot $$k, \phi_i = \sum_k \phi_{ik}^*.$$

29. A method according to claim 28 wherein the objective function is:

$$Z_y = \max_y \left\{ \sum_{i=1}^{N_u} y_i \right\}$$

or an equivalent thereof such that $$\sum_{i=1}^{N_u} \phi_{ik} u_{ik} \leq 1 \qquad k = 1, 2, \ldots, N_s$$

$$\sum_{i=1}^{N_u} \omega_{ik} \Phi(u_{ik}) \leq WC_k \qquad k = 1, 2, \ldots, N_s$$

$$y_i = \Phi\left( \sum_{k=1}^{N_s} \alpha_{ik} \phi_{ik} u_{ik} - \xi \right) \qquad i = 1, 2, \ldots, N_u$$

$0 \leq u_{ik} \leq 1$ $i=1,2,\ldots,N_u$, $k=1,2,\ldots,N_s$ $y_i \in \{0,1\}$ $i=1,2,\ldots,N_u$.

30. A method according to claim 28 wherein the objective function is:

$$Z_{y,u,x} = \min_{y,u,x} \left\{ -\left\{ C_1 \sum_i y_i + C_2 \xi \sum_i \sum_k u_{ik} \right\} + K_1 \sum_i \sum_k x_{ik} + K_2 \sum_i x_i \right\}$$

or an equivalent thereof.

31. A method according to claim 28 wherein the optimization is performed using a Lagrangean relaxation technique employing decomposition and subgradiant optimization.

32. The method according to claim 20 wherein determining for at least one packet, fractional orthogonal channel gains comprises:

determining fractional orthogonal channel gains for a given packet based in part upon a priority value for a user associated with the given packet.

33. The method according to claim 32 wherein determining fractional orthogonal channel gains further comprises:

determining a priority value for a user by maintaining a count of frame errors that have occurred in previously transmitted packets associated with the user.

* * * * *

UNITED STATES PATENT AND TRADEMARK OFFICE
CERTIFICATE OF CORRECTION

PATENT NO. : 7,391,779 B2  Page 1 of 4
APPLICATION NO. : 10/179953
DATED : June 24, 2008
INVENTOR(S) : Sung K. Park et al.

It is certified that error appears in the above-identified patent and that said Letters Patent is hereby corrected as shown below:

In column 5, line 28, "...$0 \leq u_{ik} \leq 1i$..." should be --$0 \leq u_{ik} \leq 1$    $i$...--; and In column 9, line 11, "...Required (Eb/Nt); /★ this is typically a constant ★/..." should be --...Required (Eb/Nt), /* this is typically a constant */...--; and In column 9, line 60, "...$0 \leq u_{ik} \leq 1i$..." should be --$0 \leq u_{ik} \leq 1$    $i$...--; and In column 9, line 61, "...$y_t \in \{0,1\} i = 1,2,..., N_u$..." should be --...$y_i \in \{0,1\}$    $i = 1,2,..., N_u$...--

In column 11, line 43, "...$u_{ik} \leq M_1 x_{ik}$..." should be --...$u_{ik} \leq M_1 x_{ik}$...--; and In column 11, line 53, "...$1 \geq u_{ik} \geq 0$..." should be --...$1 \geq u_{ik} \geq 0$...--; and In column 13, line 19, "...$u_{ik} \leq M_1$..." should be --...$u_{ik} \leq M_1$...--; and In column 13, line 36, "...$u_{ik} \leq M_1$..." should be --...$u_{ik} \leq M_1$...--; and In column 14, line 63, "...$1 \geq u_{ik} \geq 0$..." should be --...$1 \geq u_{ik} \geq 0$...--; and In column 14, line 67, "...$\lambda_{ik}, \lambda_i \geq 0$..." should be --...$\lambda_{ik}, \lambda_i \geq 0$...--; and In column 15, line 4, "...Subproblem(y,x): /★ subproblem having only y,x ★/..." should be --...Subproblem(y,x): /* subproblem having only y,x */...--; and In column 15, line 27, "...Subproblem(u): /★ subproblem having only u ★/..." should be --...Subproblem(u): /* subproblem having only u */...--; and In column 15, line 43, "...$1 \geq u_{ik} \geq 0$..." should be --...$1 \geq u_{ik} \geq 0$...--; and Signed and Sealed this Twenty-sixth Day of October, 2010

David J. Kappos
*Director of the United States Patent and Trademark Office*

CERTIFICATE OF CORRECTION (continued)

In column 15, line 60, "...$C_2 \xi \geqq 0$..." should be --...$C_2 \xi \geq 0$...--; and In column 16, line 1, "...Subproblem(x): /★ subproblem having only x ★/..." should be --...Subproblem(x): /* subproblem having only x */...--; and In column 17, line 26, "...(RHS$\geqq \omega$..." should be --...(RHS$\geq \omega$...--; and In column 17, line 37, "...(RHS$\geqq \omega$..." should be --...(RHS$\geq \omega$...--; and In column 17, line 62, " ...set $u_{i^\circ k} = 1 /$★ maximally allocated ★/..." should be -- ...set $u_{i^\circ k} = 1$ /* maximally allocated */...--; and In column 17, line 66, " ...$u_{i^\circ k} = RHS / \phi_{i^\circ k}$ "/★ partially allocated ★/..." should be -- ...$u_{i^\circ k} = RHS / \phi_{i^\circ k}$ /* partially allocated */...--; and In column 18, line 6, "...1/Ø maximally allocated Ø/..." should be --...1/* maximally allocated */...--; and In column 18, line 9, "...Ø partially allocated Ø/..." should be --.../* partially allocated */...--; and In column 18, line 32, ".../★ these solutions are infeasible to (10) ★/..." should be --.../* these solutions are infeasible to (10) */...--; and In column 18, line 36, ".../★ make it befeasible to (10) ★/..." should be --.../* make it be feasible to (10) */...--; and In column 18, line 39, ".../★ these solutions are infeasible to (12) ★/..." should be --.../* these solutions are infeasible to (12) */...--; and In column 18, line 48, ".../★ make it be feasible to (12) ★/..." should be --.../* make it be feasible to (12) */...--; and In column 18, line 60, ".../★ $x_i = y_i = 1$★/..." should be --.../* $x_i = y_i = 1$*/...--; and In column 18, lines 63 to 64, "...do /★ make it be feasible to (12) ★/..." should be --...do /* make it be feasible to (12) */...--; and In column 18, line 67, "...(RHS$\geqq u_{ik}$..." should be --...(RHS$\geq u_{ik}$...--; and In column 19, line 12, ".../★ the following procedure..." should be --.../* the following procedure...--; and In column 19, line 16, "WC number perspective ★/..." should be --WC number perspective */...--; and In column 19, line 24, ".../★ slack capacity in WC gain at slot K ★/..." should be --.../* slack capacity in WC gain at slot K */...--; and In column 19, line 32, ".../★ slack capacity in WC number at slot K ★/..." should be --.../* slack capacity in WC number at slot K */...--; and In column 19, line 34, "...=0/★ this user..." should be --...=0/* this user...--; and In column 19, line 35, "...capacity ★/..." should be --...capacity */...--; and In column 19, line 36, ".../★ unscheduled user set ★/..." should be --.../* unscheduled user set */...--; and In column 19, line 39, "...+1/★ in constraint (12) ★/..." should be --...+1/* in constraint (12) */...--; and In column 19, lines 45 to 46, ".../★ schedule this user at slot k ★/..." should be --.../* schedule this user at slot k */...--; and In column 19, line 47, ".../★ due to constraint (10) ★/..." should be --.../* due to constraint (10) */...--; and In column 19, line 56, ".../★ check for constraint (12) ★/..." should be --.../* check for constraint (12) */...--; and In column 19, lines 60 to 61, ".../★ $(\overline{Y}, \overline{U}, \overline{X})$ is a feasible to Problem[Scheduler( )]★/..." should be --.../* $(\overline{Y}, \overline{U}, \overline{X})$ is a feasible to Problem[Scheduler( )]*/...--; and In column 21, claim 10, line 39, "...determining optiniized CDM channel..." should read --determining optimized CDM channel...--; and In column 22, claim 15, line 4, "...plurality of orthogonal channels during each tune slot,..." should read --...plurality of orthogonal channels during each time slot,...--; and In column 22, claim 20, line 56, "...determining fraction orthogonal channel gains..." should read --...determining fractional orthogonal channel gains...--; and In column 23, claim 28, line 59, "...perfonning an optimization of..." should read --performing an optimization of...--; and

CERTIFICATE OF CORRECTION (continued)
U.S. Pat. No. 7,391,779 B2

In column 24, claim 28, line 8 and subsequent equation: "...according to $\phi_{ik}* = \phi_{ik}u_{ik}$ for user i in slot $$k, \phi_i = \sum_k \phi_{ik}*.$$"

should read --...according to $\phi_{ik}* = \phi_{ik}u_{ik}$ for user i in slot k, $$\phi_i = \sum_k \phi_{ik}*.$$ --

In column 24, claim 29, line 36, "...$0 \leq u_{ik} \leq 1 i = 1,2,..., N_u, k = 1,2,..., N_s$..." should read --...--; and In column 24, claim 29, line 38, "...$y_i \in \{0,1\} i = 1,2,..., N_u$..." should read --...$y_i \in \{0,1\} \quad i = 1,2,..., N_u$...--.